(No Model.)
E. MAYNARD.
FLOATING LIFE LINE.
No. 411,161. Patented Sept. 17, 1889.
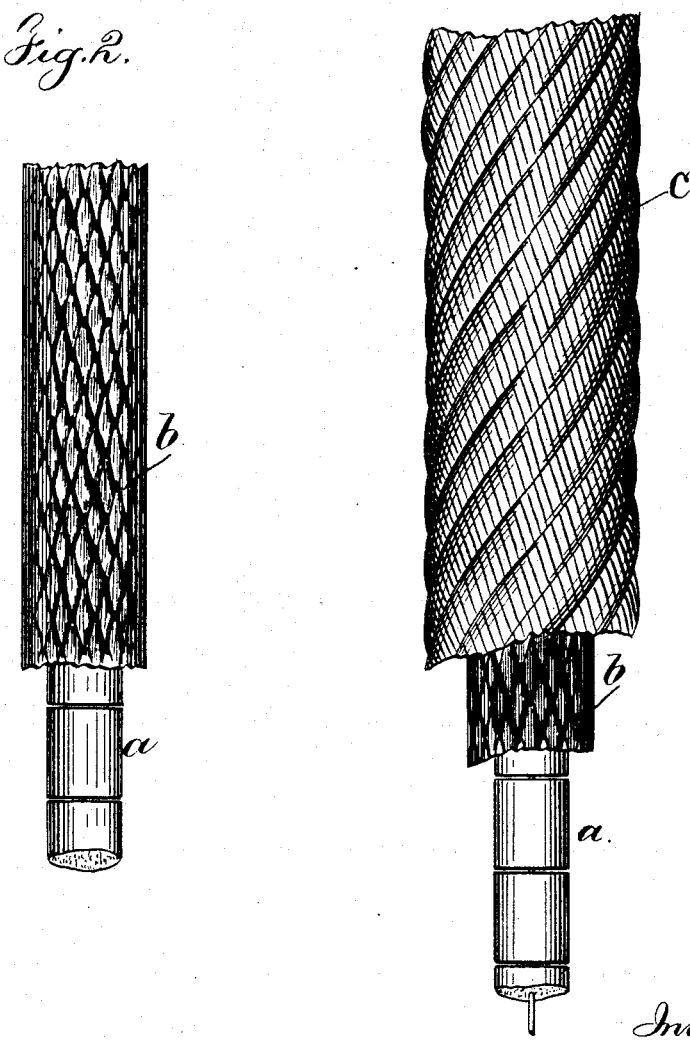
Witnesses
Chas H. Smith
J. Stail
Inventor
Edward Maynard.
per Lemuel W. Serrell
atty

UNITED STATES PATENT OFFICE.

EDWARD MAYNARD, OF BROOKLYN, NEW YORK.

FLOATING LIFE-LINE.

SPECIFICATION forming part of Letters Patent No. 411,161, dated September 17, 1889.

Application filed May 23, 1889. Serial No. 311,812. (No model.)

*To all whom it may concern:*

Be it known that I, EDWARD MAYNARD, of Brooklyn, in the county of Kings and State of New York, have invented an Improvement in Floating Life Lines or Hawsers, of which the following is a specification, Ropes have been made with floats attached thereto, and in some instances a tube or bag of flexible material filled with granulated cork has been used as a core around which the twisted strands are laid; but the tension on the strands causes them to embed themselves into the granulated cork and tube, and such granulated cork becomes water-soaked and looses its buoyancy.

My invention relates to a life-line or hawser adapted to float in the water, so that such life line or hawser can be thrown overboard and paid out from a vessel, so that it may reach the shore, in cases of emergency—such as shipwreck—where a line cannot be thrown, or the line may be allowed to troll behind a fishing or other vessel as a life-line for any person falling overboard.

In the drawings, Figure 1 represents my improvement as applied to a hawser, and Fig. 2 shows a life-line.

I make use of cylinders of cork or similar light wood that will float easily. These cylinders $a\ a$ should be rather longer than their diameter, and they are placed end to end in forming the core, and they are covered with a tube, preferably composed of braided threads or strands $b\ b$, so that the cork cylinders cannot escape, and for small life-lines the strands $b$ may be sufficiently large and strong to compose the rope or line; but for large ropes and hawsers the strands $c$, Fig. 1, are applied around the braided tube containing the cork cylinders.

The cork cylinders are sufficiently strong not to be injured or displaced or put out of shape by the tension of the strands, and they do not become water-soaked as rapidly as granulated cork, and hence retain their buoyant properties, and the line or hawser is floated by such cork cylinders and the floating power is uniform from end to end of the line or hawser. The corks $a\ a$ may be strung upon a thread or cord, as shown in Fig. 1.

In case of a vessel in distress at sea in a storm a line of this character can be thrown over from another vessel and troll behind the same as such vessel changes its course until the floating line is brought to the vessel in distress and is picked up and drawn aboard and fastened, so as to be used as a means for communicating in saving passengers or in drawing aboard a line for towing.

This life-line may also be used at ferries or in fishing or yachting, and be thrown overboard for saving persons from drowning.

I claim as my invention—

The life line or hawser having a core of short cylinders of cork or similar wood with the strands around and inclosing the same, substantially as set forth.

Signed by me this 20th day of May, 1889.

E. MAYNARD.

Witnesses:
 GEO. T. PINCKNEY,
 WILLIAM G. MOTT.